(12) United States Patent
Cote et al.

(10) Patent No.: US 8,331,754 B2
(45) Date of Patent: Dec. 11, 2012

(54) STRAIN RELIEF DEVICE AND METHOD FOR FIBER OPTIC CABLES

(75) Inventors: Monique L. Cote, Fort Worth, TX (US);
Brent M. Frazier, Haslet, TX (US);
William J. Giraud, Azle, TX (US);
Raymond G. Jay, Mansfield, TX (US)

(73) Assignee: Corning Cable Systems LLC, Hickory, NC (US)

( * ) Notice: Subject to any disclaimer, the term of this patent is extended or adjusted under 35 U.S.C. 154(b) by 405 days.

(21) Appl. No.: 12/565,543

(22) Filed: Sep. 23, 2009

(65) Prior Publication Data

US 2011/0069931 A1  Mar. 24, 2011

(51) Int. Cl.
*G02B 6/00* (2006.01)

(52) U.S. Cl. .......................... 385/136; 385/137; 174/135

(58) Field of Classification Search .......... 385/134–137; 174/135
See application file for complete search history.

(56) References Cited

U.S. PATENT DOCUMENTS

| | | | | |
|---|---|---|---|---|
| 3,913,876 A * | 10/1975 | McSherry | ..................... | 248/74.3 |
| 3,942,750 A * | 3/1976 | Noorily | ......................... | 248/74.3 |
| 4,439,896 A * | 4/1984 | Matsui | ......................... | 24/16 PB |
| 4,447,934 A * | 5/1984 | Anscher | ..................... | 24/16 PB |
| 4,458,385 A * | 7/1984 | Espinoza | .................... | 24/16 PB |
| 4,510,650 A * | 4/1985 | Espinoza | .................... | 24/16 PB |
| 4,805,856 A * | 2/1989 | Nicoli et al. | ................ | 248/74.3 |
| 4,813,105 A * | 3/1989 | Espinoza | .................... | 24/16 PB |
| 5,794,461 A * | 8/1998 | Smith | ............................. | 70/16 |
| 5,938,155 A * | 8/1999 | Garland | ...................... | 248/187.1 |
| 6,053,457 A | 4/2000 | Ozga et al. | ...................... | 248/58 |
| 6,149,109 A * | 11/2000 | Stankowski | ................. | 248/74.3 |
| 6,289,895 B1 * | 9/2001 | Cheng et al. | .................. | 128/885 |
| 6,370,810 B1 * | 4/2002 | Widerman | .................... | 43/21.2 |
| 7,661,207 B2 * | 2/2010 | Monsees et al. | ............... | 36/122 |

* cited by examiner

*Primary Examiner* — Daniel Petkovsek
(74) *Attorney, Agent, or Firm* — John H. Vynalek

(57) ABSTRACT

A fiber optic strain relief device is provided. The device has a base that attaches to a piece of equipment and/or hardware. A length of strap positions in the base and forms a loop. The loop is adapted to at least partially encircle a portion of a cable positioned at the base. A strap tightener incrementally shortens the length of the strap, reducing the loop and tightening the strap around the cable. The strap tightener may be a ratchet assembly comprising an actuator, a ratchet cap, a pin, a ratchet lock and a release. The length of strap inserts into a slot in the pin. The ratchet assembly operates to tighten the length of strap encircling the portion of the cable by incrementally rotating the pin. The release allows the strap to be loosened around the fiber optic cable.

8 Claims, 5 Drawing Sheets

STRAIN RELIEF DEVICE AND METHOD FOR FIBER OPTIC CABLES

BACKGROUND

1. Field of the Disclosure

The technology of the disclosure relates to fiber optic devices and methods, and, particularly, a device and method for strain relieving fiber optic cables.

2. Technical Background

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. To effectively and safely route optical fibers between connection points, single or multiple optical fibers may be arranged in a fiber optic cable. Typically, the fiber optic cable may comprise some form of jacketing or covering to protect the optical fiber from damage due to environmental conditions and handling. Additionally, fiber optic cables protect the optical fibers from damage due to tension or stress. This protection may include a strength member that runs the length of the fiber optic cable and designed to sustain the tensioning or stressing instead of the optical fibers.

Even with such protection, forces may strain the optical fibers and the connections attached to the ends of the optical fibers. Therefore, strain relief devices may be applied to fiber optic cables. Strain relieving a fiber optic cable is typically performed to prevent undue strain on the connectors and other more sensitive components. Conventional strain relief devices and methods involve multiple time consuming steps as well as potential pressure points that could damage the optical fiber. Most strain relief devices and methods also do not accommodated cables of different diameters or multiple cables without inserts or other secondary pieces. Furthermore, typical strain relief devices and methods may involve clamps, fasteners, shims and various other components which require multiple time-consuming steps to accomplish the desired result. Additionally, it is necessary to provide strain relief without simply crimping a crimp band around the fibers. Doing so would cause damage to the optical fibers, degrading or even eliminating the signal passing that point.

SUMMARY OF THE DETAILED DESCRIPTION

Embodiments disclosed in the detailed description include devices and methods for strain relieving a fiber optic cable. In one embodiment there is provided a fiber optic cable strain relief device comprising a base, a length of strap and a strap tightener. The length of strap positions in the base and is adapted to at least partially encircle a cable, such as, for example, a fiber optic cable, positioned at the base. A strap tightener is configured to shorten the length of strap in incremental steps, tightening the length of strap encircling the cable. In this way strain relief may be provided to the cable. A release operates to allow the strap to be loosened from around the fiber optic cable.

In one embodiment, there is provided a fiber optic cable strain relief device, comprising a base, a length of strap positioned in the base and forming a loop and a ratchet assembly. The loop is adapted to at least partially encircle a cable positioned at the base. The ratchet assembly comprises an actuator, a ratchet cap, a pin, a ratchet lock, and a release. The length of strap inserts into a slot in the pin. The ratchet assembly operates to tighten the length of strap encircling the cable by incrementally rotating the pin thereby shortening the length of the strap around the cable. In this way strain relief may be provided to the cable. The release has a release button which when pushed allows the strap to be loosened around the fiber optic cable.

The actuator has an actuator body and a thumb lever for operating the actuator. Pressing down the thumb lever rotates the actuator body and the ratchet cap resulting in the incremental rotation of the pin. The rotation of the pin incrementally shortens the length of the strap, reducing the loop, and tightening the strap around the cable.

The actuator has one or more actuator teeth and the ratchet cap has one or more ratchet teeth. At least one of the actuator teeth engage with the at least one of the ratchet teeth to cause the ratchet cap to rotate in a direction when the actuator body rotates in the direction. The ratchet cap has at least one ratchet rib and the pin has a pin head with radial teeth. At least one of the ratchet ribs engages with at least one of the radial teeth to cause the pin to rotate in a direction when the ratchet cap rotates in the direction.

The ratchet assembly further comprises a ratchet lock, which releasably retains the ratchet cap and the pin in the incrementally rotated position. The ratchet lock has one or more lock teeth and the pin comprises a pin head having one or more lateral teeth. At least one of the lateral teeth engages at least one of the lock teeth to allow the pin head to rotate in a rotational direction but restricts the pin head from moving in a reverse rotational direction.

Additional features and advantages of the embodiments will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the embodiments. The accompanying drawings are included to provide a further understanding of the embodiments, and are incorporated into and constitute a part of this specification. The drawings illustrate various embodiments, and together with the description serve to explain the principles and operation of the embodiments.

DETAILED DESCRIPTION OF THE EMBODIMENTS

Reference will now be made in detail to the embodiments, examples of which are illustrated in the accompanying drawings, in which some, but not all embodiments are shown. Indeed, the embodiments may be embodied in many different forms and should not be construed as limiting herein; rather, these embodiments are provided so that this disclosure will satisfy applicable legal requirements. Whenever possible, like reference numbers will be used to refer to like components or parts.

Further, as used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. An example of a bend-insensitive optical fiber is ClearCurve® Multimode optical fiber, manufactured and/or sold by Corning Incorporated.

Figure 1:
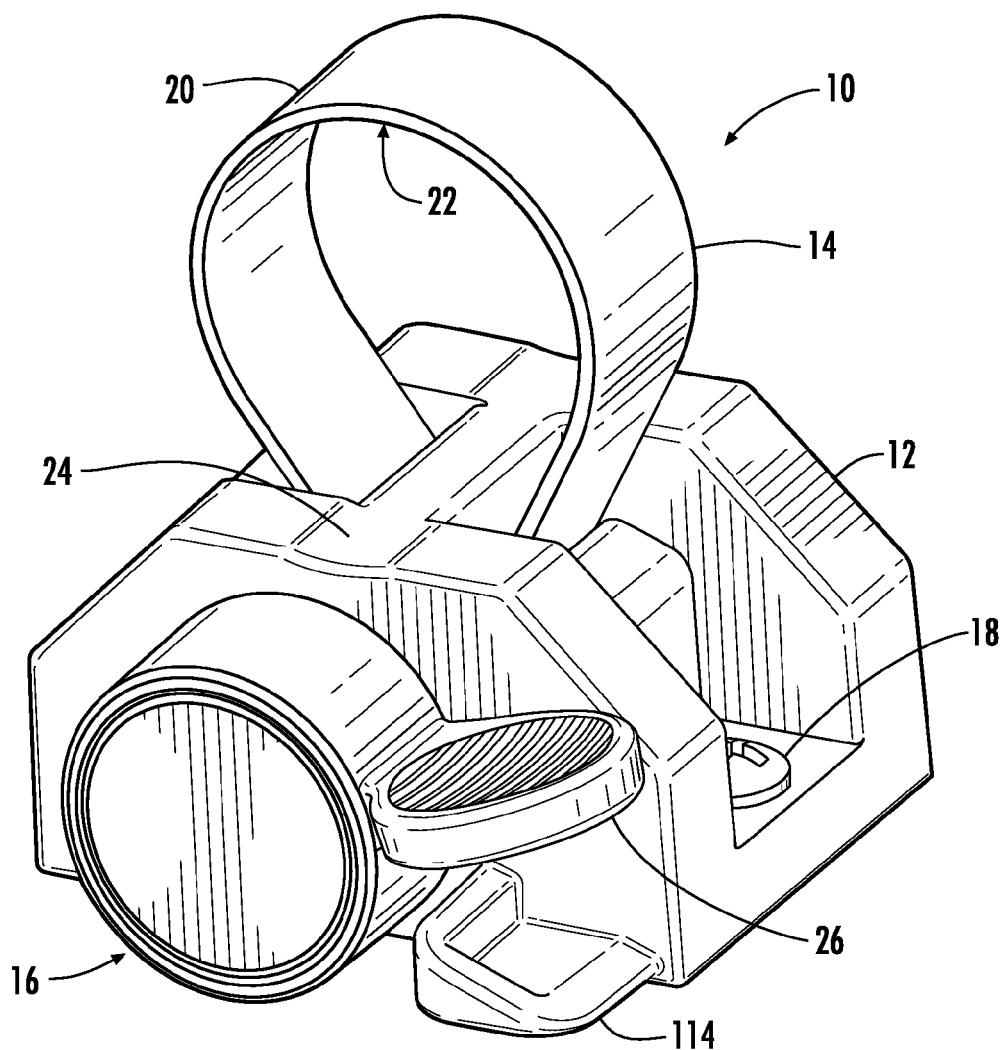
FIG. 1 is a front perspective view of an exemplary embodiment of a strain relief device in a fully assembled state.

An exemplary embodiment of a strain relief device 10 is illustrated in FIG. 1. The strain relief device 10 has a base 12, a strap 14 and a strap tightener 16. Although not shown in FIG. 1, the strain relief device 10 may be attached and/or anchored to a piece of equipment or hardware at the base 12 using screws 18 or any other suitable fastener, including without limitation, clamp, bolt, rivet and/or adhesive or other fastening means. A length 20 of the strap 14 positions in the base 12 and forms a loop 22 through which a cable, for example a fiber optic cable (not shown), may position. In this manner, the length 20 of the strap 14 may at least partially encircle the cable, with the cable positioned on the base 12 at a support 24 formed in the base 12. The strap tightener 16 operates to shorten the length 20 of the strap 14 reducing the size of the loop 22, and, thereby, tightening the strap 14 around the cable. Additionally, the strap tightener 16 may be operated to provide for the loosening of the strap 14 around the cable allowing for the removal of the cable, the addition of a cable, and/or other adjustment thereto. In FIG. 1, the strap tightener 16 includes an actuator 26, which may be operated by manipulating the actuator 26 to tighten and loosen the strap 14. The actuator 26 may be any mechanism used to operate the strap tightener 16. Although reference in this description may be made to fiber optic cables, it should be noted that the strain relief device 10 may be used to strain relief any type of cable, including, without limitation, fiber optic cables and copper cables, of any type or design.

Figure 2:
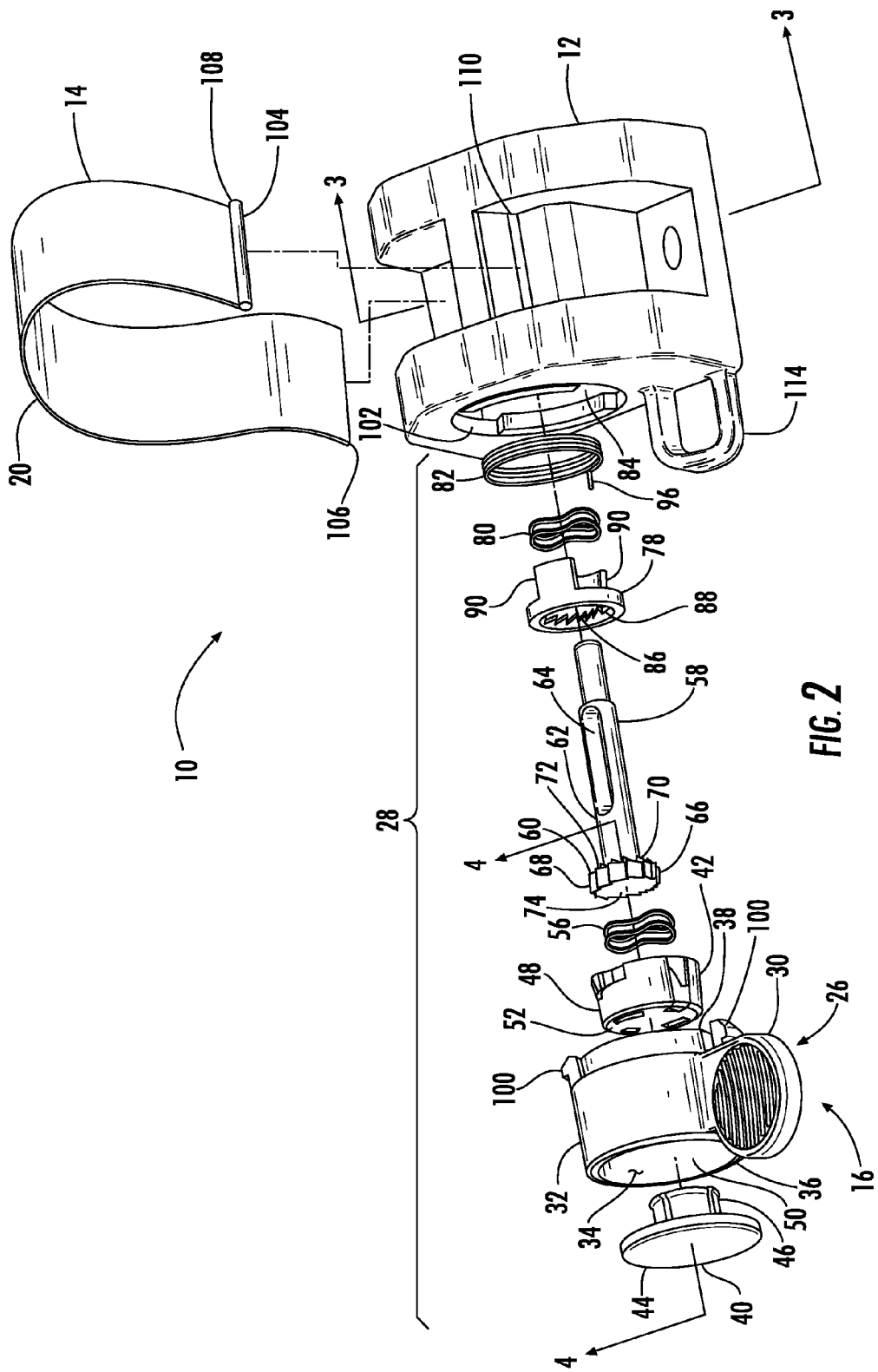
FIG. 2 is an exploded, perspective view of the strain relief device of FIG. 1.

The strap tightener 16 may be any suitable mechanism or device that operates to tighten the strap 14 around a cable. FIG. 2 illustrates an exemplary embodiment of a ratchet assembly 28. The actuator 26 of the ratchet assembly 28 of the embodiment has a thumb lever 30 and an actuator body 32. The thumb lever 30 extends from and is attached to the actuator body 32. The actuator body 32 may be frustoconically shaped, with a passage 34 extending therethrough. The passage 34 has a distal end 36 and a proximal end 38, determined with respect to the base 12. The side of the actuator body 32 tapers toward the distal end 36. In the embodiment shown in FIG. 2, a release 40 inserts into the distal end 36 and a ratchet cap 42 inserts into the proximal end 38. The release 40 has a release button 44 and a drive 46. The ratchet cap 42 may also be frustoconically shaped with an outside surface 48 tapered such that, when assembled in the actuator body 32, the outside surface 48 of the ratchet cap 42 aligns with an inside surface 50 of the actuator body 32. The ratchet cap 42 has a closed end 52 and an open end 54 (not visible in FIG. 2). When assembled in the actuator body 32, the drive 46 of the release 40 may contact the closed end 52 of the ratchet cap 42. A more detailed discussion of the actuator 26, release 40 and ratchet cap 42 is provided below.

Continuing with reference to FIG. 2, a first wave spring 56 and a pin 58 are shown. The pin 58 has a pinhead 60, rod 62, and pin slot 64. Radial teeth 66 extend radially outwardly from an edge 68 of the pinhead 60. Lateral teeth 70 extend from an inside face 72 of the pinhead 60. The first wave spring 56 and the pinhead 60, in the direction of an outside face 74, insert into the open end 54 of the ratchet cap 42. When inserted into the ratchet cap 42, the radial teeth 66 contact at least one ratchet rib 76 (not visible in FIG. 2) of the ratchet cap 42. The pin 58 is in mechanical communication with the ratchet cap 42 and the actuator 26 through the actuator body 32. A more detailed discussion of the ratchet cap 42, the first wave spring 56 and the pinhead 60 is provided below.

Figure 4:
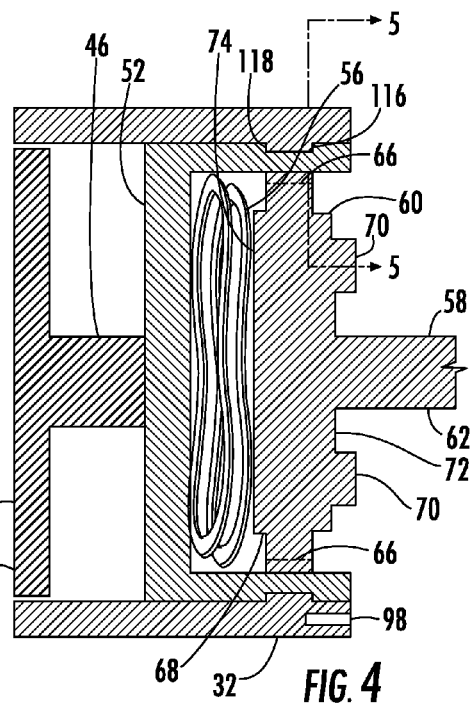
FIG. 4 is a section view cut through FIG. 2 showing a partial detail view of a release, an actuator body, a ratchet cap, a first wave spring, and a pin of the assembled strain relief device.

The rod 62 inserts through a ratchet lock 78, second wave spring 80, and torsion spring 82, into base entry 84. The ratchet lock 78 has an aperture 86 through which the rod 62 passes until the lateral teeth 70 engage lock teeth 88 extending radially innerwardly into the aperture 86. The second wave spring 80 positions inside lock tabs 90 extending from the ratchet lock 78. The lock tabs 90 pass through torsion spring 82 and into tab slots 92 (not visible in FIG. 2) at the base entry 84. The lock tabs 90 retain the ratchet lock 78 in a stationary position. When assembled, pin 58, ratchet lock 78, second wave spring 80, and the torsion spring 82 position in the base 12 through base entry 84. A base end 94 (not visible in FIG. 2) of the torsion spring 82 fits into a base hole 95 in the base 12. An actuator end 96 of the torsion spring 82 fits into an actuator hole 98 in the actuator body 32, which is shown in FIG. 4. Actuator latches 100 on the actuator body 32 locate into base slots 102 releasably attaching the actuator 26 to the base 12, and, thereby, releasably attaching the fully assembled ratchet assembly 28 to the base 12. The actuator latches 100 may have hooked ends to facilitate releasably attaching the fully assembled ratchet assembly 28 to the base 12.

Figure 3:
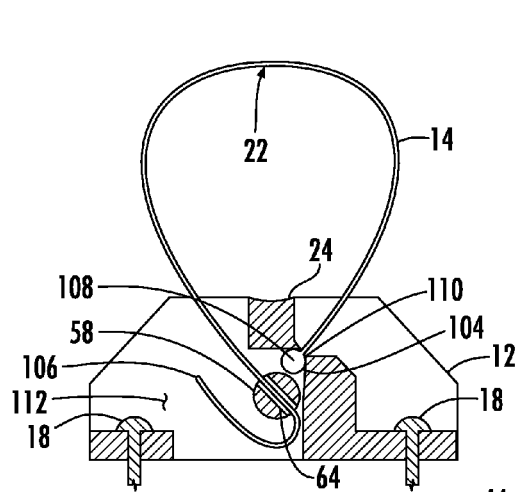
FIG. 3 is a section view cut through the base of the strain relief device of FIG. 1.

In FIG. 2, the strap 14 is shown disassembled from the base 12. The strap 14 has a fixed end 104 and a slot end 106. The fixed end 104 has a bead 108 along the edge. The strap 14 inserts into the base 12 from the bottom by feeding the slot end 106 of the strap 14 through strap slot 110. Prior to or after releasably attaching the ratchet assembly 28 to the base 14, the strap 14 may be fed into and partially through the base 12. In either case, the strap 14 may be ready and available for encircling the cable and insertion in the pin slot 64. When feeding the strap 14 in and through the base 12, the strap 14 passes through the strap slot 110 until the bead 108 reaches the strap slot 110. The diameter of the bead 108 is larger than the width of the strap slot 110. Therefore, the bead 108 cannot pass through the strap slot 110 and, accordingly, the fixed end 104 is retained by strap slot 110 in the base 12. This can be seen in FIG. 3 which illustrates a section cut in FIG. 2 through the base 12. With the fixed end 104 retained in the base 12, the length 20 of strap 14 is looped around to form loop 22 thereby allowing slot end 106 to be routed back into the base 12 and inserted through pin slot 64 in the pin 58. A curl space 112 is provided in the base 12 for the slot end 106 and a portion of the strap 14 inserted through the pin slot 64 to accumulate.

Once the ratchet assembly 28 is fully assembled to the base 12 and the slot end 106 of the strap 14 is fed through the strap slot 110 in the base 12, the strain relief device may be operated to strain relief a cable. A cable is positioned on the support 24. The length 20 of the strap 14 is looped around the cable with the slot end 106 routed into the base 12. The loop 22 is now encircling, at least partially, the cable. The thumb lever 30 may be used to rotate the pin 58, as necessary, to line up the pin slot 64 in the base 12 so that the pin slot 64 may be accessible for insertion of the slot end 106 of the strap 14. Once the slot end 106 is inserted in the pin slot 64, the ratchet assembly 28 may be operated to tighten the strap 14 around the cable to provide strain relief.

Operating the ratchet assembly 28 begins by pressing down the thumb lever 30 which rotates the actuator body 32. The rotation of the actuator body 32 rotates the pin 58. Since the slot end 106 of the strap 14 has been inserted in the pin slot 64, the rotation of the pin 58 forces the length 20 of the strap 14 to accumulate in the curl space 112. As the length 20 accumulates in the curl space 112, the length 20 of the loop 22 shortens, tightening the loop 22 around the cable.

The thumb lever 30 may be pressed down until it contacts lever stop 114 which extends from the base 12. In this way, the travel of the thumb lever 30 and, thereby, the rotation of the actuator body 32 and the pin 58 are limited. The actuator body 32 and the pin 58 rotate to the stopped point and are releasably locked at that point. By this action, the length 20 of the strap 14 is shortened by the rotation of the pin 58. Since the pin 58 is releasably locked, the length 20 of the strap 14 is retained in the shortened length. The torsion spring 82 biases the thumb lever 30 such that the thumb lever 30 returns to its original, non-rotated, position enabling the thumb lever 30 to be pressed again in a repeated manner. Accordingly, the repeated pressing of the thumb lever 30 provides for an incremental tightening action of the ratchet assembly 28.

Pressing and holding in the release button 44 forces the ratchet cap 42 to disengage from the actuator body 32, allowing the ratchet cap 42 and, thereby, the pin 58 to free-wheel. Since the pin 58 may free-wheel, the length 20 of strap 14 is not retained in the shortened length. The strap 14 may be loosened around the cable by manually pulling on the length 20 of the strap 14. The first wave spring 56 and the second wave spring 80 bias the ratchet cap 42 and the pin 58, respectively, back to the original position with the ratchet cap 42 engaged with the actuator body 32 when the release button 40 is not held in.

Figure 5:
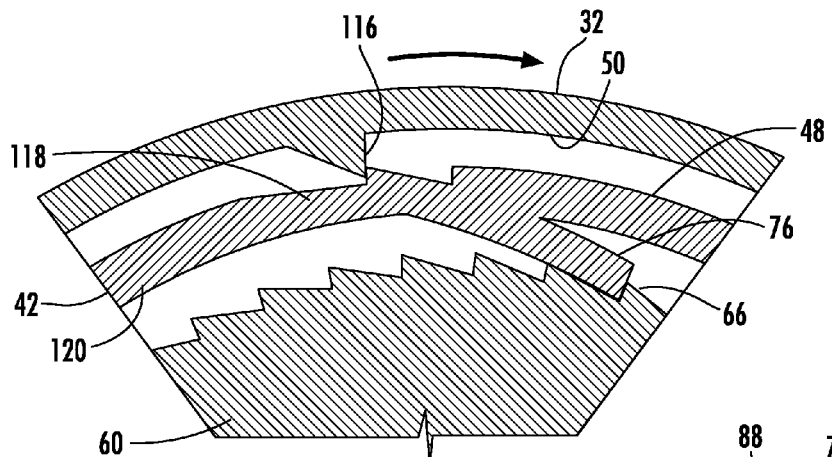
FIG. 5 is a section cut through the detail view of FIG. 4.

Referring now also to FIGS. 4 and 5 the actuator body 32, the ratchet cap 42, the pin 58 and the release 40 will be discussed in more detail. Actuator teeth 116 extend from the inner surface 50 of the actuator body 32. When the actuator body 32 rotates, the actuator teeth 116 engage with at least one of the ratchet teeth 118 in the outside surface 48 of the ratchet cap 42. In this embodiment, the actuator body 32 rotates clockwise when viewed from the perspective of the distal end 36 as shown by the arrow in FIG. 5. The actuator teeth 116 engaged with the ratchet teeth 118 cause the ratchet cap 42 to rotate clockwise with the actuator body 32. In like manner, ratchet ribs 76 on the inside surface 120 of the ratchet cap 42 engage the radial teeth 66 on the edge 68 of the pin head 60. In this respect, as the ratchet cap 42 rotates due to the rotation of the actuator body 32, the ratchet ribs 76 of the ratchet cap 42 engage the radial teeth 66 which cause the pin 58 to also rotate clockwise. The ratchet teeth 118 are shaped such that when the actuator body 32 returns to its original position, as discussed above, the actuator teeth 116 do not forceably engage the ratchet teeth 118. In other words, the rotation of the actuator body 32 counterclockwise back to its original, non-rotated, position will not also force the ratchet cap 32, and thereby, will not cause the pin 58 to rotate counterclockwise. Additionally, the actuator teeth 116 on the inside surface 50 of the actuator body 32 and the ratchet teeth 118 on the outside surface 48 of the ratchet cap 42 also serve to help prevent over-tightening of the strap around the cable. The actuator teeth 116 and/or the ratchet teeth 118 may be resilient. Moreover, the shape and thickness of the actuator teeth 116 and/or the ratchet teeth 118 may be such that if too much torque is applied, the ratchet teeth 118 flex, thereby disengaging from the actuator teeth 116 and allowing the actuator body 32 to slip over the outside surface 48 of the ratchet cap 42. In this way, the ratchet assembly 28 protects against over-tightening of the strap 14 on the cable. It should be understood, though, that the action of the strap tightener 16 can be either clockwise or counterclockwise, and/or involve any other type of action, including a non-rotational action to tighten the strap 14.

Figure 6:
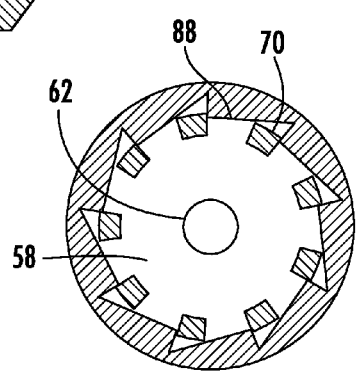
FIG. 6 is a partial detail view of an exemplary embodiment of the pin, a pin head and a ratchet lock.

When the actuator body 32 returns to its original, unrotated, position, the ratchet cap 42 and the pin 58 are retained in the rotated position. This is accomplished using the ratchet lock 78. FIG. 6 illustrates a detail of the ratchet cap 32 and the ratchet lock 78 viewed from the perspective of the base 12. Lateral teeth 70 of the pin 58 extend into the aperture 86 of the ratchet lock 78 and engage the lock teeth 88 of the ratchet lock 78. The lock teeth 88 are designed to allow the lateral teeth 70 to move in one rotational direction, for example, clockwise, and restrict movement in the reverse rotational direction, for example, counter-clockwise. Since the lock tabs 90 fix the ratchet lock 78 in a stationary position, when the lateral teeth 70 are engaged with the lock teeth 88, the pin 58 may be allowed to move in a clockwise, or tightening, rotation, but the pin 58 is restricted from moving in the reverse, a counter-clockwise, or loosening, rotation.

The pin 58 remains restricted from rotating in the counter-clockwise rotation until the release button 40 is pressed. Pressing the release button 40 causes the drive 46 to force the ratchet cap 42 toward the base 12. By the ratchet cap 42 moving toward the base 12, the actuator teeth 116 disengage from the ratchet teeth 118. This motion also presses the ratchet lock 78 toward the base 12. As the ratchet lock 78 moves toward the base 12 the lock teeth 88 and the lateral teeth 70 on the pin head 60 disengage. Once the lateral teeth 70 disengage from the lock teeth 88, the pin 58 is not restricted by the ratchet lock 78 and can free-wheel. Since the pin 58 can free-wheel, the ratchet cap 42 also can free-wheel. This frees both the pin 58 and the ratchet cap 42 to rotate in the reverse or counter-clockwise direction allowing the strap 14 to be loosened. The ratchet cap 42 and the pin 58 remain in a free-wheeling condition until the release button 44 is not held in, or, in other words, until the release button 44 is released. In such case, the second wave spring 80 biases the pin head.

When the release button 44 returns to its original, not pressed, position, the first wave spring 56 forces, or biases, the ratchet cap 42 back such that the actuator teeth 116 engage the ratchet teeth 118. The second wave spring 80 forces the pin head 60 back such that the lateral teeth 70 engage the lock teeth 88. The strap tightener 16 is in a condition to be operated to tighten the strap around a cable.

Figure 7:
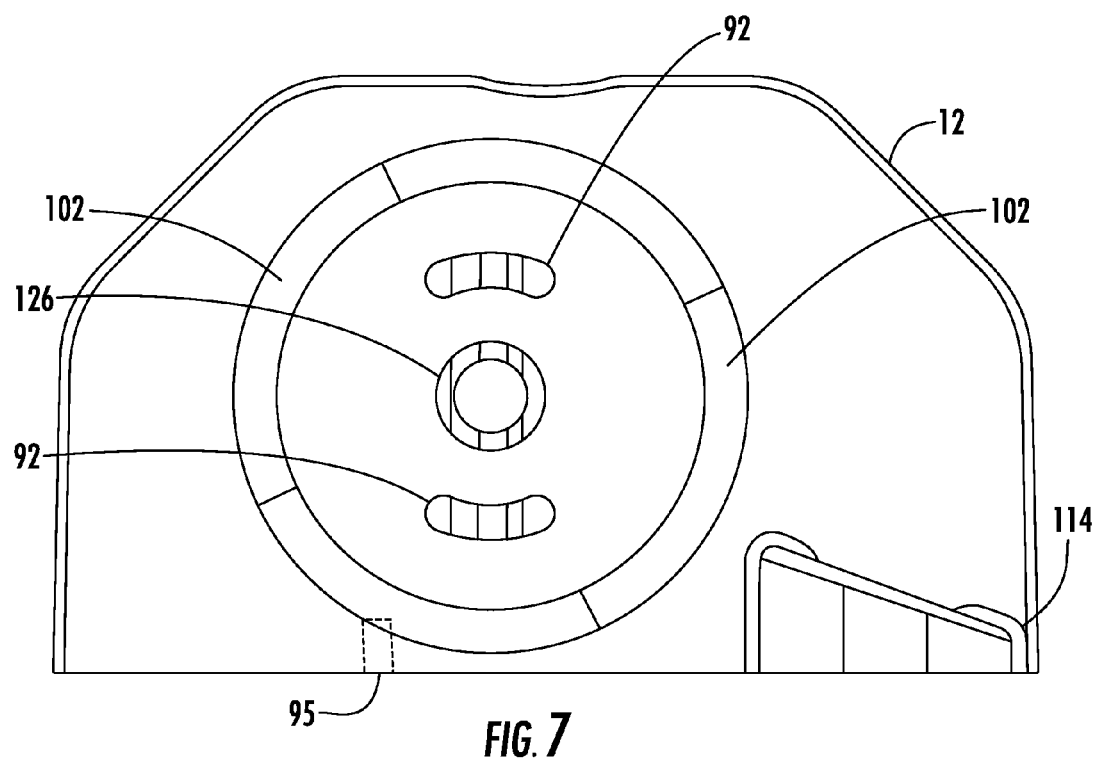
FIG. 7 is elevation view of the base without the strap or the ratchet assembly.

Referring to FIG. 7, there is shown an elevation view of the base 12 showing the base entry 84 without the strap 14 or the ratchet assembly 28. This view is provided to illustrate and further discuss the tab slots 92 and the base hole 95. The lock tabs 90 position in the tab slots 92 to releasably retain the ratchet lock 78 in a stationary position when it is assembled with the base 12. The base end 95 of the torsion spring 82 positions into the base hole 95 to releasably attach the torsion spring 82 to the base 12. Although not shown, the base end 95 may be formed as a hook to facilitate attachment to the base 12.

Figure 8:
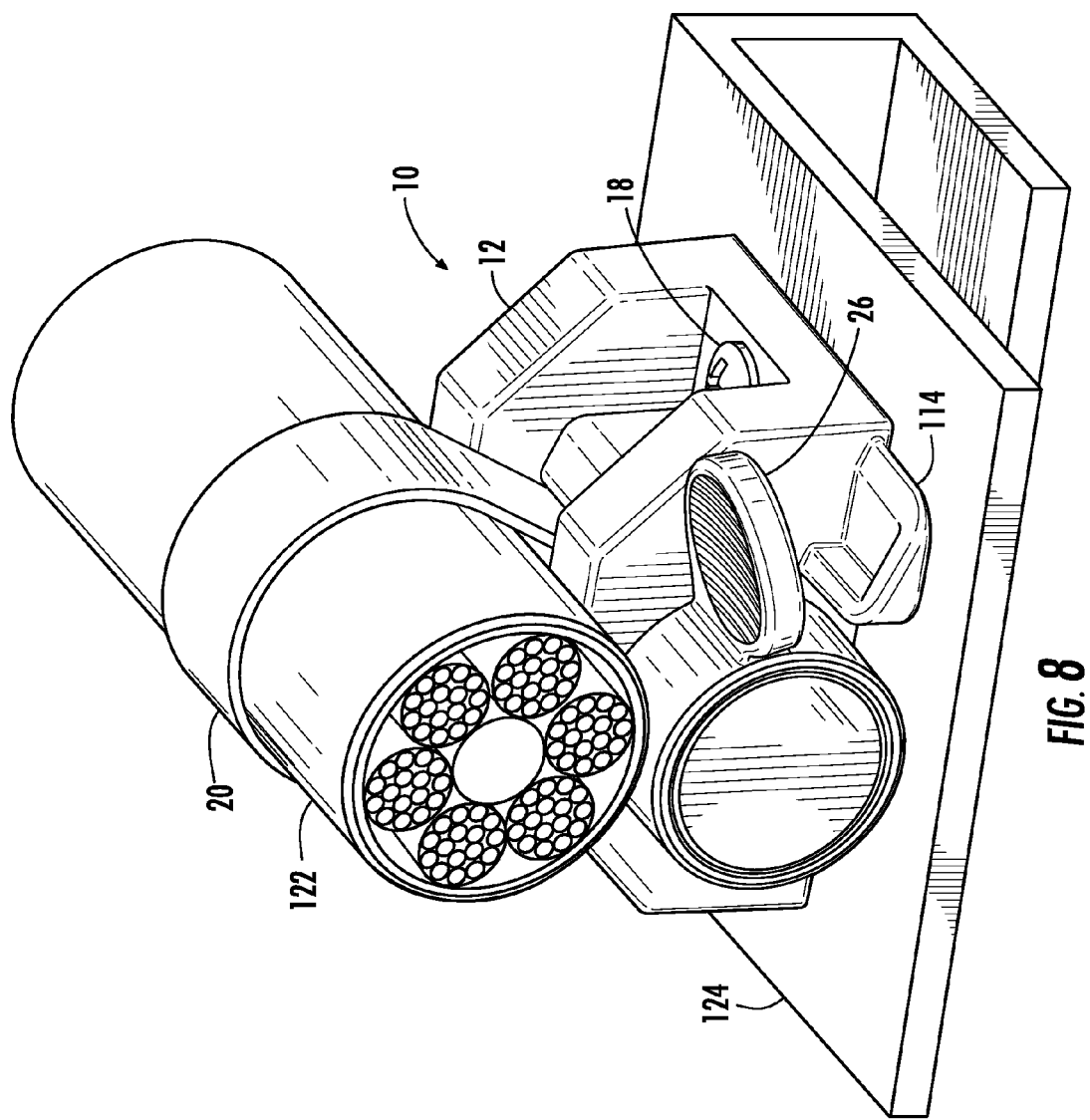
FIG. 8 is a perspective view of the strain relief device with a fiber optic cable positioned on the base.

Referring now to FIG. 8, there is shown an assembled strain relief device 10 with a portion of a fiber optic cable 122 shown positioned on the base support 24 and the loop 22 of the strap 14 encircling it. The strap 14 is shown tightened against the fiber optic cable 122. The strain relief device 10 is mounted to a bracket 124 which may be attached to a fiber optic equipment or component (not shown).

Many modifications and other embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic cable strain relief device, comprising:
   a base;
   a length of strap positioned in the base and forming a loop, wherein the loop is adapted to at least partially encircle a cable positioned at the base; and a ratchet assembly comprising,
   an actuator, a ratchet cap, a pin, a ratchet lock, a torsion spring and a release wherein the ratchet assembly operates to tighten the length of strap encircling the cable to provide strain relief by rotating the actuator and to allow the strap to be loosened around the fiber optic cable, and wherein the length of strap inserts into a slot in the pin, and wherein the release operates to allow the strap to be loosened around the fiber optic cable, and wherein the ratchet assembly prevents over-tightening of the strap around the cable.

2. The device of claim 1, wherein the actuator has an actuator body and a thumb lever for operating the actuator, and wherein pressing down the thumb lever rotates the actuator body and the ratchet cap resulting in the incremental rotation of the pin, and wherein the rotation of the pin incrementally shortens the length of the strap, reducing the loop, and tightening the strap around the cable.

3. The device of claim 2, further comprising a lever stop, wherein the lever stop limits the travel of the thumb lever.

4. The device of claim 3, wherein the ratchet assembly further comprises a torsion spring, wherein the torsion spring biases the actuator body returning the actuator body to its original unrotated position.

5. The device of claim 2, wherein the ratchet assembly further comprises a ratchet lock, and wherein the ratchet lock releasably retains the ratchet cap and the pin in the incrementally rotated position.

6. The device of claim 5, wherein the ratchet lock has lock teeth, and the pin comprises a pin head having lateral teeth, wherein at least one of the lateral teeth engages at least one of the lock teeth to allow the pin head to rotate in a direction but restrict the pin head from rotating in the reverse direction.

7. The device of claim 1, wherein the actuator has one or more actuator teeth and the ratchet cap has one or more ratchet teeth, and wherein at least one of the one or more actuator teeth engage with at least one of the one or more ratchet teeth to cause the ratchet cap to rotate in a direction when the actuator body rotates in the direction.

8. The device of claim 1, wherein the ratchet cap has at least one rib and the pin has a pin head with radial teeth, and wherein the at least one of the ribs engages with at least one of the radial teeth to cause the pin to rotate in a direction when the ratchet cap rotates in the direction.

* * * * *